United States Patent
Liu et al.

(10) Patent No.: US 11,782,514 B2
(45) Date of Patent: Oct. 10, 2023

(54) WEARABLE DEVICE AND CONTROL METHOD THEREOF, GESTURE RECOGNITION METHOD, AND CONTROL SYSTEM

(71) Applicant: SZ DJI TECHNOLOGY CO., LTD., Shenzhen (CN)

(72) Inventors: Zhipeng Liu, Shenzhen (CN); Sijin Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 39 days.

(21) Appl. No.: 17/472,761

(22) Filed: Sep. 13, 2021

(65) Prior Publication Data

US 2021/0405763 A1    Dec. 30, 2021

Related U.S. Application Data

(63) Continuation of application No. PCT/CN2019/103440, filed on Aug. 29, 2019.

(51) Int. Cl.
*G06F 3/01*      (2006.01)
*G06T 7/246*     (2017.01)
*G06V 40/20*     (2022.01)

(52) U.S. Cl.
CPC .............. *G06F 3/017* (2013.01); *G06T 7/251* (2017.01); *G06V 40/28* (2022.01)

(58) Field of Classification Search
CPC ....... G06F 3/017; G06F 3/0304; G06T 7/251; G06V 40/28; G06V 20/20
See application file for complete search history.

(56) References Cited

U.S. PATENT DOCUMENTS

| | | | |
|---|---|---|---|
| 10,061,391 B2* | 8/2018 | Kwon | H04N 5/23216 |
| 10,509,466 B1* | 12/2019 | Miller | G06F 3/011 |
| 11,404,056 B1* | 8/2022 | Meisenholder | G10L 15/22 |
| 2015/0346828 A1* | 12/2015 | Chen | G06F 3/017 345/156 |
| 2018/0046179 A1* | 2/2018 | Choi | B64C 39/024 |

FOREIGN PATENT DOCUMENTS

| | | |
|---|---|---|
| CN | 106020227 A | 10/2016 |
| CN | 106210253 A | 12/2016 |
| CN | 106843669 A | 6/2017 |
| CN | 108874142 A | 11/2018 |
| CN | 109190461 A | 1/2019 |
| KR | 10-1724108 B1 | 4/2017 |
| TW | 201544993 A | 12/2015 |

OTHER PUBLICATIONS

International Search Report and Written Opinion dated May 26, 2020, received for PCT Application PCT/CN2019/103440, Filed on Aug. 29, 2019, 12 pages including English Translation.

* cited by examiner

*Primary Examiner* — Grant Sitta
(74) *Attorney, Agent, or Firm* — XSENSUS LLP

(57) ABSTRACT

A wearable device and its control method, a gesture recognition method, a movable platform control system and a storage medium are provided. The control method may include acquiring key point information of a gesture action of a target user, recognizing an input instruction based upon the key point information, and generating a control instruction based upon the input instruction and executing a task operation according to the control instruction.

16 Claims, 8 Drawing Sheets

Movable platform

Head-mounted display device

WEARABLE DEVICE AND CONTROL METHOD THEREOF, GESTURE RECOGNITION METHOD, AND CONTROL SYSTEM

CROSS-REFERENCE TO RELATED APPLICATION

The present application is a continuation of International Application No. PCT/CN2019/103440, filed Aug. 29, 2019, the entire contents of which being incorporated herein by reference in its entirety.

TECHNICAL FIELD

The present disclosure relates to the technical field of human-computer interaction, and particularly relates to a wearable device and its control method, a gesture recognition method, a movable platform control system and a computer-readable storage medium.

BACKGROUND

On a wearable device, the conventional interaction mode is implemented by a user touching a touchpad equipped on the wearable device. The user may only place a finger on the touchpad and swipe left and right or up and down to select a menu, which is equivalent to selecting only in a one-dimensional space, and the menu can only be swiped once by sliding the finger once. In the case, if a target button is relatively far away, the user needs to slide the finger multiple times, which is cumbersome and not fast enough. Although some studies have proposed to recognize control instructions based upon user gestures captured by an image acquisition device of the wearable device, such a recognition method is slower and less accurate.

SUMMARY

The present disclosure provides a wearable device and its control method, a gesture recognition method, a movable platform control system and a computer-readable storage medium, which aims to solve the technical problems of slow gesture recognition speed and less accurate gesture recognition of wearable devices.

According to a first aspect of the present disclosure, a control method for a wearable device is provided. The control method may include:

acquiring key point information of a gesture action of a target user;

recognizing an input instruction based upon the key point information; and generating a control instruction based upon the input instruction and executing a task operation according to the control instruction.

According to a second aspect of the present disclosure, a wearable device comprising a memory and a processor is provided. The memory is configured to store a computer program; the processor is configured to execute the computer program and, when executing the computer program, configured to:

acquire key point information of a gesture action of a target user;

recognize an input instruction based upon the key point information; and generate a control instruction based upon the input instruction and execute a task operation according to the control instruction.

According to a third aspect of the present disclosure, a movable platform control system is provided. The movable platform control system may include:

a movable platform including an image acquisition device, which is configured to send an image captured by the image acquisition device to a wearable device; and the wearable device configured to display the image sent by the movable platform.

According to a fourth aspect of the present disclosure, a gesture recognition method is provided. The gesture recognition method may include:

acquiring a first image of a gesture;

acquiring key point information of the gesture based upon the first image;

when a type of the gesture cannot be determined based upon the key point information, acquiring a second image of the gesture;

updating the key point information of the gesture based upon the second image; and obtaining a recognition result of the gesture based upon the updated key point information.

According to a fifth aspect of the present disclosure, a wearable device including a memory and a processor is provided. The memory is configured to store a computer program; the processor is configured to execute the computer program and, when executing the computer program, configured to implement the gesture recognition method described above.

According to a sixth aspect of the present disclosure, a computer-readable storage medium having stored a computer program thereon is provided, and the computer program can be executed by a processor to implement the methods described above.

Thus, the present disclosure provides a wearable device and its control method, a gesture recognition method, a movable platform control system and a computer-readable storage medium. By acquiring key point information of a gesture action of a target user, recognizing an input instruction based upon the key point information, and generating a control instruction based upon the input instruction and executing a task operation according to the control instructions, it enables a user to use hand(s) to make gesture actions to control the wearable device. By recognizing input instructions corresponding to gesture actions through key point information, information that interferes with a gesture recognition can be excluded. Therefore, the gesture recognition is faster and more accurate, which makes it easier for the user to control the wearable device more quickly and accurately.

It should be understood that the above general description and the following detailed description are only exemplary and explanatory and are not restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
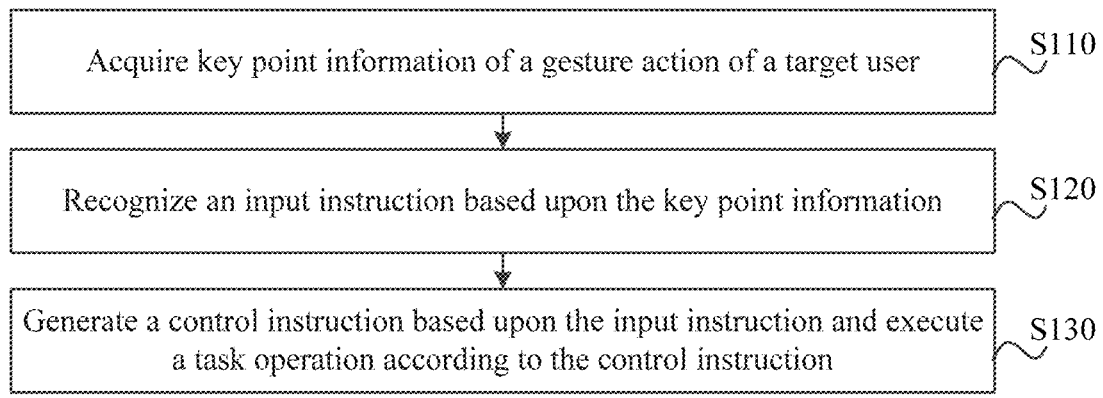
FIG. 1 illustrates a schematic flowchart of a control method for a wearable device according to some embodiments of the present disclosure.

The technical solutions and technical features encompassed in the exemplary embodiments of the present disclosure will be described in detail in conjunction with the accompanying drawings in the exemplary embodiments of the present disclosure. Apparently, the described exemplary embodiments are part of embodiments of the present disclosure, not all of the embodiments. Based on the embodiments and examples disclosed in the present disclosure, all other embodiments obtained by those of ordinary skill in the art without inventive efforts shall fall within the protection scope of the present disclosure.

Here, exemplary embodiments will be described in detail, and examples thereof are shown in the accompanying drawings. The implementation manners described in the following exemplary embodiments do not represent all implementation manners consistent with the present disclosure. On the contrary, they are only examples of devices and methods consistent with some aspects of the disclosure as detailed in the appended claims. Further, the chart(s) and diagram(s) shown in the drawings are only examples, and does not necessarily include all components, elements, contents and/or operations/steps, nor does it have to be arranged in the described or specific order. For example, some components/elements can also be disassembled, combined or partially combined; therefore, the actual arrangement may be changed or modified according to actual conditions. In the case of no conflict, the components, elements, operations/steps and other features disclosed in the embodiments may be combined with each other.

Please refer to FIG. 1. FIG. 1 illustrates a schematic flowchart of a control method of a wearable device according to some embodiments of the present disclosure. The control method of the wearable device can be applied to the wearable device to implement corresponding control functions and other processes according to gestures of a user.

The wearable device may be, for example, a helmet, a visor, a watch, glasses, a jacket, a waist belt, a protective belt, etc. equipped with an image acquisition device.

In one embodiment, the wearable device may be a head-mounted display device. The head-mounted display device may be, but is not limited to, a virtual reality (VR) display device or a first person view (FPV) display device. The head-mounted display device may also be, for example, a glasses-type display device, a helmet-type display device, or the like.

As shown in FIG. 1, the control method of the wearable device may include steps S110 to S130.

Step S110 may include acquiring key point information of a gesture action of a target user.

Figure 2:
FIG. 2 illustrates a schematic diagram of key points of a gesture action according to some embodiments of the present disclosure.

FIG. 2 illustrates a schematic diagram of key points of a gesture action according to some embodiments of the present disclosure. The triangles in FIG. 2 are used to identify key points on a target user's hand. The key points may include, but are not limited to, for example, finger joints, fingertips, wrist joints, and the like. The key point information includes location information of the key points.

The present disclosure employs a head-mounted display device as an exemplary wearable device to illustrates how the control method is applied to the head-mounted display device, it would be appreciated that the control method may also be applied to a variety of other wearable devices according to the present disclosure.

In some embodiments, in the step S110, acquiring key point information of a gesture action of a target user may include: acquiring a user image captured by an image acquisition device provided on a head-mounted display device; and determining the key point information of the gesture action based upon the user image captured by the image acquisition device provided on the head-mounted display device.

Figure 3:
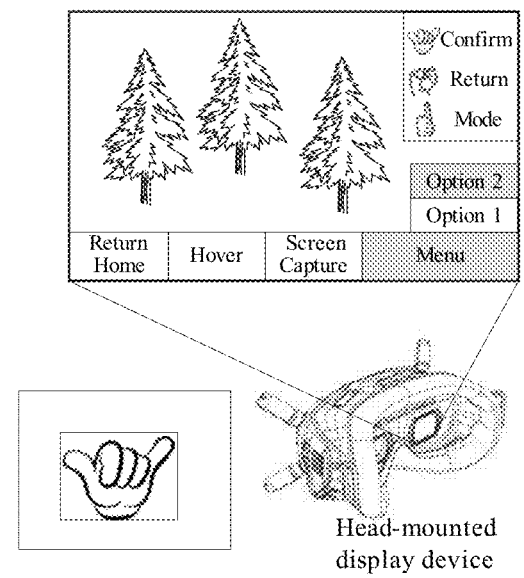
FIG. 3 illustrates a schematic diagram of an application scenario of a control method for a head-mounted display device according to some embodiments of the present disclosure.

FIG. 3 illustrates a schematic diagram of an application scenario of a control method for a head-mounted display device according to some embodiments of the present disclosure.

The target user wears the head-mounted display device, which has its own image acquisition device or is connected to an image acquisition device through a communication interface. For example, the image acquisition device may be located on a lower side, an upper side, a left side, or a right side of the head-mounted display device. The image acquisition device may be, for example, an independent camera or electronic equipment such as a mobile phone, a camera, etc.

As shown in FIG. 3, the target user may extend his hand(s) so that the hand(s) are located within a shooting field of view of the image acquisition device provided on the head-mounted display device. Therefore, the head-mounted display device may acquire a hand image of the target user through the image acquisition device. Then, the head-mounted display device may determine the key points in the hand image based upon the hand image of the target user, and obtain key point information of the gesture action as shown in FIG. 2.

In certain embodiments, the user image captured by the image acquisition device may include a background area and a hand area. The head-mounted display device may first identify the hand area in the user image, and then acquire key point information in the hand area.

In one embodiment, after the head-mounted display device acquires an image captured by the image acquisition device, the head-mounted display device performs a hand detection in the entire image and outputs the specific position of the hand(s). For example, a target frame may be used to identify the position of the hand(s). The target frame may include the coordinates of the upper left corner and the lower right corner of the target frame in the captured image; or the target frame may include the coordinates of the center of the target frame in the captured image and the width and height of the target frame.

In certain embodiments, the image captured by the image acquisition device of the head-mounted display device may include one hand area or may include two or more hand areas.

Thereafter, the head-mounted display device may crop a picture of the hand area from the image captured by the image acquisition device according to the specific position of the hand(s). Then the picture of the hand area is input into a hand key point detection neural network to obtain hand key points in the picture.

The hand key point detection neural network may be obtained by training a deep neural network to converge based upon a hand key point sample set. The hand key point sample set may include a plurality of hand pictures labeled with key points, and the plurality of hand pictures correspond to a variety of different gestures. Therefore, the trained hand key point detection neural network can more accurately detect the hand key points from the picture of the hand area.

In some embodiments, the image acquisition device provided on the head-mounted display device may include at least one of a color camera, a depth sensor, or an RGB-D (red-green-blue-depth) camera.

Images captured by the depth sensor or RGB-D camera have depth characteristics, and the key points of hand(s) can be detected more accurately based upon the images captured by the depth sensor or RGB-D camera.

In some embodiments, the head-mounted display device is equipped with at least two image acquisition devices. The head-mounted display device determines the key point information of the gesture action based upon user images captured by the at least two image acquisition devices provided thereon. The at least two image acquisition devices are located at different positions on the head-mounted display device, or they are located at the same position but with different shooting angles. In this way, user images of the target user may be acquired at different viewing angles, thereby determining hand images of the target user at different viewing angles. It can get richer information about the key points of gesture actions.

For example, in one embodiment, multiple image acquisition devices may respectively acquire key point information on the palm and back of the hand(s), so as to prevent a decrease in a gesture recognition accuracy rate caused by the occlusion of a part of key points of the hand(s).

Step S120 may include recognizing an input instruction based upon the key point information.

Figure 4:
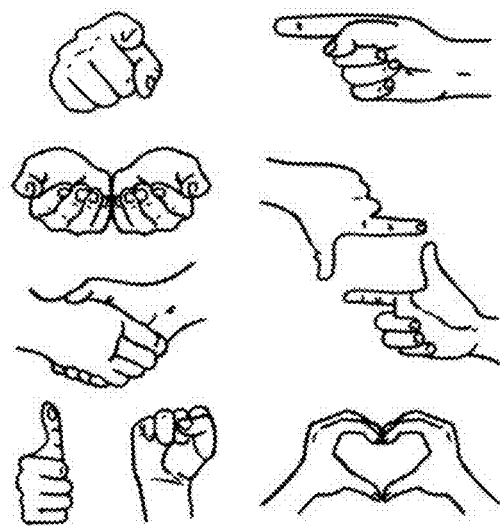
FIG. 4 illustrates a schematic diagram of different types of gesture actions according to some embodiments of the present disclosure.

In some embodiments, a type of the gesture action may be determined based upon the key point information of the gesture action. FIG. 4 illustrates a schematic diagram of different types of gesture actions. As shown in FIG. 4, the types of gesture actions may include one-hand gesture actions or two-hand gesture actions.

In some embodiments, the key point information is sent to a gesture action classification model; the key point information is classified based upon the gesture action classification model to obtain the input instruction.

In certain embodiments, the gesture action classification model may be obtained by training a deep neural network to converge based upon a gesture sample set. The gesture sample set may include a plurality of key point information and gesture labels corresponding to each of the plurality of the key point information. The plurality of key point information corresponds to a variety of different gestures. Therefore, the trained gesture action classification model can more accurately recognize the gesture action of the target user based upon the key point information.

In certain embodiments, the head-mounted display device may pre-store a mapping table between gesture actions and input instructions. The mapping table includes a correspondence between a number of gesture actions and a number of input instructions. Therefore, the head-mounted display device may determine a corresponding input instruction according to the recognized gesture action of the target user.

As shown in FIG. 3, the interface displayed by the head-mounted display device includes corresponding relationships between three illustrative gesture actions and three illustrative input instructions in the upper right corner of the interface. When a user needs an input instruction, the user may make a corresponding gesture with his hand in front of the image acquisition device according to the displayed corresponding relationship.

For example, the user puts his thumb up and holds the remaining four fingers. The head-mounted display device may recognize the gesture action of the target user, and determine that the input instruction is a mode switching instruction according to the gesture action.

In other embodiments, the key point information is sent to an instruction classification model; the key point information is classified based upon the instruction classification model to obtain the input instruction.

In certain embodiments, the instruction classification model may be obtained by training a deep neural network to converge based upon a gesture sample set. The gesture sample set includes a plurality of key point information and instruction labels corresponding to each of the plurality of the key point information. The plurality of key point information corresponds to a variety of different gestures. Therefore, the trained instruction classification model can more accurately recognize the input instructions of the target user based on the key point information.

It is understandable that, in certain embodiments, the head-mounted display device need not to recognize the gesture action, but directly recognize the input instruction based upon the key point information. In other embodiments, the mapping table of gesture actions and input instructions may not be stored.

In some embodiments, if the input instruction recognized based upon the key point information is a mode switching instruction, a body interaction mode is turned on or off according to the mode switching instruction.

The body interaction mode is used to execute task operations according to control instructions generated by recognized input instructions.

For example, when the target user wants to turn on the body interaction mode to control the head-mounted display device to interact according to gesture actions made by the target user, the target user may make a gesture action corresponding to the mode switching instruction. Then, the head-mounted display device may turn on the body interaction mode according to the determined mode switching instruction.

When the body interaction mode is turned on, the head-mounted display device acquires key point information of a gesture action of the target user, and recognizes an input instruction based upon the key point information. If it is recognized that the input instruction is the mode switching instruction again, the body interaction mode is turn off. After turning off the body interaction mode, if the recognized input instruction is not the mode switching instruction, the input instruction will not be responded to. If the recognized input instruction is the mode switching instruction, then the body interaction mode will be turned on.

When the body interaction mode is turned on, the head-mounted display device responds to the recognized input instruction.

Step S130 may include generating a control instruction based upon the input instruction, and executing a task operation according to the control instruction.

In some embodiments, different input instructions correspond to different control instructions.

In an exemplary embodiment, the head-mounted display device pre-stores a mapping table of input instructions and control instructions. The mapping table includes corresponding relationships between a number of input instructions and a number of control instructions.

For example, a user may associate an input instruction with a function specified by the user through a setting operation, such as a screen capture function of a screen displayed by the head-mounted display device. The head-mounted display device may adjust a corresponding relationship between an input instruction and a control instruction according to the user's setting operation, the control instruction corresponding to a function specified by the user.

Therefore, the head-mounted display device can determine a corresponding control instruction based upon the recognized input instruction. A control instruction is then generated based upon the input instruction, and a task operation is executed according to the control instruction.

In other embodiments, as shown in FIG. 3, the head-mounted display device may display an interactive operation interface.

In certain embodiments, executing a task operation according to a control instruction may include switching an interactive operation interface displayed by the head-mounted display device according to the control instruction.

In one embodiment, when the input instruction is an instruction to switch to the next interactive operation interface, then according to the currently displayed interactive operation interface and the input instruction, a control instruction for controlling the head-mounted display device to switch to the next interactive operation interface is generated, so that the head-mounted display device may switch to the next interactive operation interface.

For example, if the input instruction is a confirmation instruction, a control instruction for controlling the head-mounted display device to switch to the next interactive operation interface is generated according to the currently displayed interactive operation interface and the input instruction, so that the head-mounted display device switches to the next interactive operation interface.

For example, if the input instruction is a return instruction, a control instruction for controlling the head-mounted display device to switch to the previous interactive operation interface is generated according to the currently displayed interactive operation interface and the input instruction, so that the head-mounted display device returns to the previous interactive operation interface.

In other embodiments, generating the control instruction based upon the input instruction may include determining operation control information based upon an interactive operation interface currently displayed on the head-mounted display device and the input instruction, and generating a corresponding control instruction based upon the operation control information.

In one embodiment, when the head-mounted display device displays a certain interactive interface, it is allowed to save a screen displayed by the head-mounted display device according to a user's gesture action. When the head-mounted display device displays that interactive interface, if the input instruction recognized based upon the key point information is a confirmation instruction, operation control information may be determined based upon the input instruction to correspond to a screen capture function. Based upon the operation control information, a control instruction corresponding to the screen capture function is generated, so that the head-mounted display device may save the currently displayed picture.

In another embodiment, the interactive operation interface may display one virtual button or a plurality of virtual buttons, and the virtual buttons correspond to different operation control information.

For example, an interactive operation interface may include a virtual button corresponding to the screen capture function. When the head-mounted display device displays the interactive operation interface, if the input instruction recognized based upon the key point information is a confirmation instruction, it can be determined based upon the input instruction that the operation control information corresponds to the screen capture function. Based upon the operation control information, a control instruction corresponding to the screen capture function is generated, so that the head-mounted display device saves the currently displayed picture.

In certain embodiments, determining operation control information based upon the interactive operation interface and the input instruction may include determining a function button in the interactive operation interface and determining operation control information based upon the function button and the input instruction.

Figure 5:
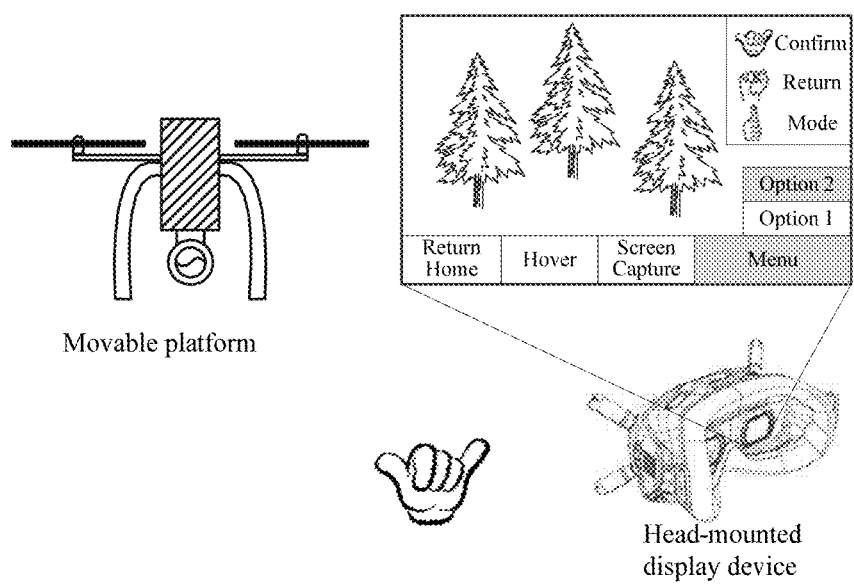
FIG. 5 illustrates a schematic diagram of an application scenario of a control method for a head-mounted display device according to some embodiments of the present disclosure.

FIG. 5 illustrates a schematic diagram of an application scenario of a control method for a head-mounted display device according to some embodiments of the present disclosure. As shown in FIG. 5, the head-mounted display device is communicatively connected to a movable platform, for example, an unmanned aerial vehicle.

In certain embodiments, as shown in FIG. 5, the interactive operation interface includes a plurality of function buttons, such as a return home button corresponding to control the unmanned aerial vehicle to return home, a hover button corresponding to control the unmanned aerial vehicle to hover, a screen capture button corresponding to capture a screen, and a menu button.

In one embodiment, a function button selected by a user in the interactive operation interface is determined, and then operation control information is determined based upon the function button selected by the user and the input instruction.

In some embodiments, the head-mounted display device determines a position of a preset portion of a target user's hand in the interactive operation interface based upon key point information of a target user's gesture action and then determines a function button based upon the position of the preset portion of the target user's hand in the interactive operation interface.

For example, the head-mounted display device may determine a position of the fingertip of an index finger of the target user in the interactive operation interface based upon the key point information of the gesture action. Specifically, a position of a cursor corresponding to the fingertip of the index finger in the interactive operation interface is determined based upon the position of the fingertip of the index finger of the target user in a user image captured by the image acquisition device provided on the head-mounted display device.

In certain embodiments, a user may control a cursor in the interactive operation interface by moving an index finger of a left or right hand. When the cursor moves to a certain function button in the interactive operation interface, it is determined that the certain function button is a function button that responds to the input instruction. The head-mounted display device may trigger the function of the function button in response to the input instruction, such as controlling an unmanned aerial vehicle to hover or return home.

For example, when a function button determined in an interactive operation interface is a function button corresponding to a return home instruction, if the input instruction recognized based upon the key point information is a confirmation instruction, operation control information corresponding to return home can be determined based upon the input instruction. A control instruction is generated based upon the operation control information, so that the head-mounted display device sends a return home instruction to the unmanned aerial vehicle according to the control instruction, thereby controlling the unmanned aerial vehicle to return home.

In some embodiments, executing a task operation according to the control instruction may include adjusting a menu in an interactive operation interface currently displayed on the head-mounted display device.

In certain embodiments, as shown in FIG. 3, the interactive operation interface includes a menu button. When a function button determined in the interactive operation interface is the menu button, if the input instruction recognized based upon the key point information is a confirmation instruction, operation control information corresponding to the deployment of the menu may be determined based upon the input instruction. A control instruction is generated based upon the operation control information, so that the head-mounted display device displays option buttons corresponding to the menu in the interactive operation display interface, for example, option 1 and option 2.

For example, the head-mounted display device determines a position of a preset part of the target user's hand in the interactive operation interface based upon the key point information of the target user's gesture action and determines a function button corresponding to option 2 according to the position in the interactive operation interface. If the input instruction recognized later based upon the key point information is a confirmation instruction, operation control information corresponding to the option 2 may be determined based upon the input instruction. A control instruction is generated based upon the operation control information, so that the head-mounted display device may implement an operation corresponding to the option 2.

In some embodiments, the head-mounted display device is communicatively connected to a movable platform.

In certain embodiments, the movable platform may be an unmanned aerial vehicle, an unmanned vehicle, an unmanned boat, or the like. The unmanned aerial vehicle (UAV) may be, for example, a rotary wing UAV, such as a quadrotor UAV, a hexarotor UAV, an octorotor UAV, or a fixed wing UAV.

In certain embodiments, executing a task operation according to the control instruction may include starting to store or ending to store data acquired by the head-mounted display device from the movable platform according to the control instruction.

For example, the head-mounted display device acquires data from the movable platform through a communication link with the movable platform, such as images captured by an image acquisition device provided on the movable platform. After generating a certain control instruction, the head-mounted display device starts to store or ends to store the data acquired from the movable platform according to the control instruction.

In certain embodiments, executing a task operation according to the control instruction may include sending a platform control instruction to a movable platform according to the control instruction to control the movable platform.

For example, if a control instruction corresponding to return home is generated based upon the input instruction, the head mounted display device sends a platform control instruction for controlling the return home of the movable platform to the movable platform according to the control instruction. If a control instruction corresponding to an acceleration is generated based upon the input instruction, the head mounted display device sends a platform control instruction for controlling the acceleration of the movable platform to the movable platform according to the control instruction.

In some embodiments, the control method is applied to a watch, and the watch includes an image acquisition device, for example, a camera.

In one embodiment, the watch acquires key point information of a gesture action of a target user through a camera, and then recognizes an input instruction based upon the key point information, and generates a control instruction based upon the input instruction and executes a task operation according to the control instruction.

It will be appreciated that the watch may also display an interactive operation interface. The watch may also switch the displayed interactive operation interface according to the control instruction, determine operation control information according to the currently displayed interactive operation interface and the input instruction, and generate corresponding control instructions based upon the operation control information.

It is understandable that the watch may also be communicatively connected to a movable platform, and the watch may trigger the function of a function button in response to the input instruction, such as controlling an unmanned aerial vehicle to hover or return home.

In some embodiments, as shown in FIG. 5, the head-mounted display device is connected to a movable platform, and the movable platform is equipped with an image acquisition device. For example, the head-mounted display device may be connected to the movable platform through a wired manner or a wireless communication manner.

The movable platform may have its own image acquisition device or be connected to an image acquisition device through a communication interface. The image acquisition device may include at least one of a color camera, a depth sensor, or an RGB-D camera. The image acquisition device may be, for example, an independent camera or electronic equipment such as a mobile phone or a camera.

In certain embodiments, in step S110, acquiring key point information of a gesture action of a target user may include determining the key point information of the gesture action based upon a user image captured by the image acquisition device provided on the movable platform and a user image captured by the image acquisition device provided on the head-mounted display device.

Therefore, the head-mounted display device can determine the key point information of the gesture action based upon the user image captured by the head-mounted display device and the user image captured by the movable platform. As such, user images of the target user under different viewing angles can be acquired, and hand images of the target user are determined under different viewing angles. Therefore, richer key point information of the gesture action may be obtained, and it can prevent a gesture recognition accuracy rate from decreasing caused by the occlusion of a part of key points of the hand(s). For example, the key point information on the palm and back of the hand(s) of the target user can be determined based upon the user image captured by the head-mounted display device and the user image captured by the movable platform.

Figure 6:
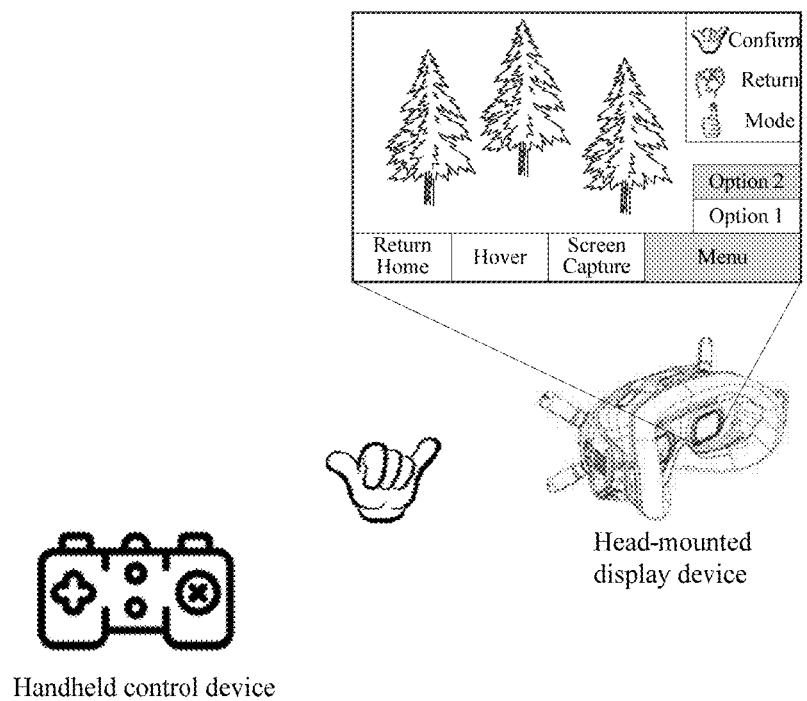
FIG. 6 illustrates a schematic diagram of an application scenario of a control method for a head-mounted display device according to some embodiments of the present disclosure.

In some embodiments, as shown in FIG. 6, the head-mounted display device is connected to a handheld control device, and the handheld control device is equipped with an image acquisition device. For example, the image acquisition device may be connected to the handheld control device in a wired manner or connected to the handheld control device in a wireless communication manner.

In certain embodiments, the head-mounted display device may also execute corresponding operations or functions according to control instructions sent by the handheld control device, such as switching an interactive operation interface, determining a function button in an interactive operation interface, and turning on or off a body interaction mode, etc.

The handheld control device may have its own image acquisition device or be connected to an image acquisition device through a communication interface. The image acquisition device may include at least one of a color camera, a depth sensor, or an RGB-D camera. The image acquisition device is, for example, an independent camera or electronic equipment such as a mobile phone, a camera etc.

In certain embodiments, in the step S110, acquiring key point information of a gesture action of a target user may include determining the key point information of the gesture action based upon a user image captured by the image acquisition device provided on the handheld control device and a user image captured by the image acquisition device provided on the head-mounted display device.

Therefore, the head-mounted display device can determine the key point information of the gesture action based upon the user image captured by the head-mounted display device and the user image captured by the handheld control device. In this way, user images of the target user under different viewing angles may be acquired, and hand images of the target user are determined under different viewing angles. Therefore, richer key point information of gesture actions can be obtained, and it prevents a gesture recognition accuracy rate from decreasing caused by the occlusion of a part of key points of the hand(s). For example, the key point information on the palm and back of the hand(s) of the target user can be determined based upon the user image captured by the head-mounted display device and the user image captured by the handheld control device.

It will be appreciated that when the control method is applied to a wearable device such as a watch, the wearable device such as a watch may also be communicatively connected to a movable platform and/or a handheld control device.

The wearable device such as a watch may also determine key point information of a gesture action based upon a user image captured by the wearable device and a user image captured by the handheld control device and/or the movable platform.

Figure 7:
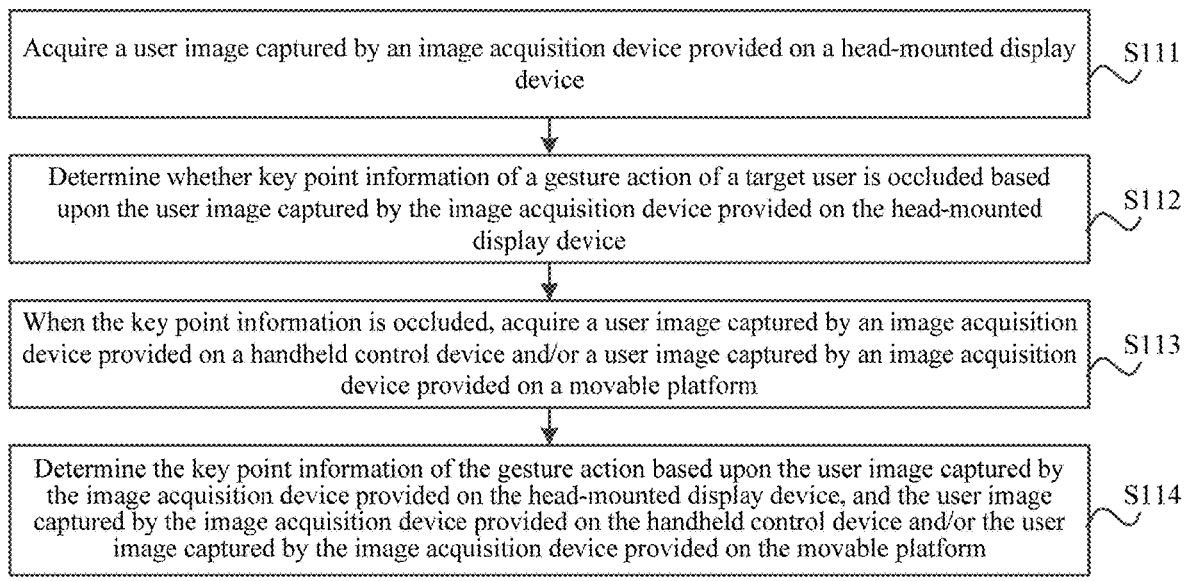
FIG. 7 illustrates a schematic diagram of a sub-process of acquiring key point information in FIG. 1 according to some embodiments of the present disclosure.

In some embodiments, as shown in FIG. 7, obtaining the key point information of the gesture action of the target user in step S110 may further include step S111 to step S114.

In step S111, a user image captured by an image acquisition device provided on the head-mounted display device is acquired.

In step S112, whether the key point information of the gesture action of the target user is occluded based upon the user image captured by the image acquisition device provided on the head-mounted display device is determined.

In one embodiment, key points in a hand image are determined based upon the user image captured by the image acquisition device provided on the head-mounted display device. If the number of key points is less than a preset threshold, such as 22, which is not limited in the present disclosure, it is determined that a part of the key point information of the gesture action is occluded. If the number of key points is not less than the preset threshold, it is determined that the key point information of the gesture action is not occluded.

If it is determined that the key point information of the gesture action is not occluded, then the key point information of the gesture action is determined based upon the user image captured by the image acquisition device provided on the head-mounted display device.

In step S113, if the key point information is occluded, a user image captured by an image acquisition device provided on a handheld control device is acquired and/or a user image captured by an image acquisition device provided on a movable platform is acquired.

Figure 8:
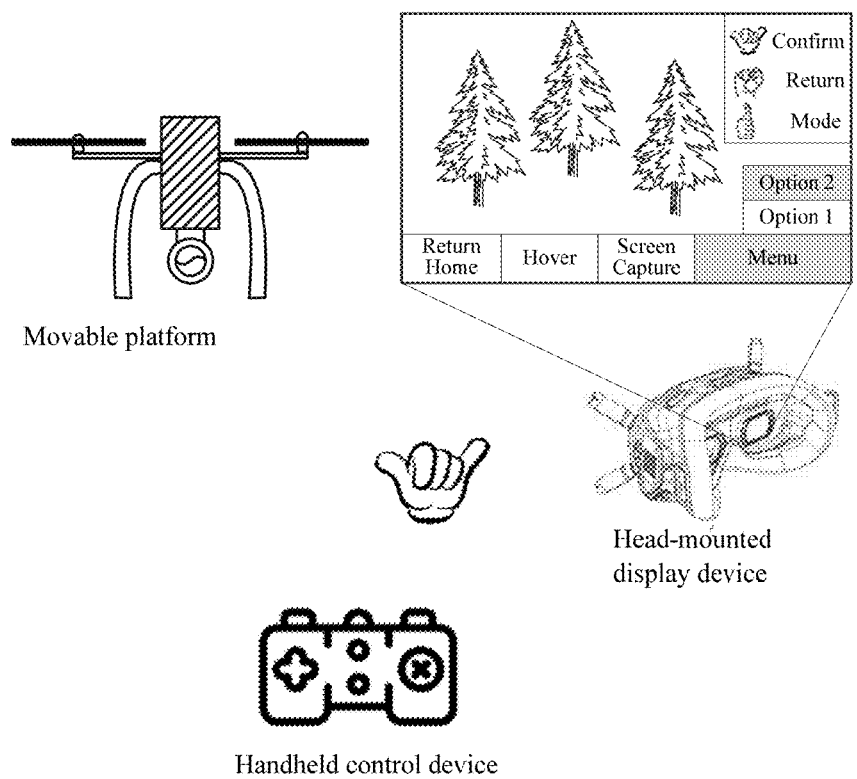
FIG. 8 illustrates a schematic diagram of an application scenario of a control method for a head-mounted display device according to some embodiments of the present disclosure.

As shown in FIG. 5, FIG. 6 or FIG. 8, the head-mounted display device is connected to a movable platform and/or a handheld control device. The movable platform and/or the handheld control device are each equipped with an image acquisition device.

If it is determined that the key point information of the gesture action in the user image captured by the image acquisition device provided on the head-mounted display device is occluded, the movable platform and/or the handheld control device are requested to send user images captured by image acquisition devices provided on the movable platform and/or the handheld control device.

In step S114, the key point information of the gesture action is determined based upon the user image captured by the image acquisition device provided on the head-mounted display device, and the user image captured by the image acquisition device provided on the handheld control device and/or the user image captured by the image acquisition device provided on the movable platform.

Therefore, the head-mounted display device can determine the key point information of the gesture action based upon the user image captured by the head-mounted display device and the user images captured by the movable platform and/or the handheld control device. In this way, user images of the target user under different viewing angles can be obtained, and hand images of the target user are determined under different viewing angles. Thus, richer key point information of gesture actions may be obtained, and it prevents a gesture recognition accuracy rate from decreasing caused by the occlusion of a part of key points of the hand(s). For example, it can determine key point information on the palm and back of a target user's hand.

In some embodiments, the key point information of the gesture action of the target user is acquired in step S110, which may include the following steps: acquiring a user image captured by an image acquisition device provided on a movable platform; determining whether the key point information of the gesture action of the target user is occluded; if it is determined that the key point information of the gesture action is not occluded, determining the key point information of the gesture action based upon the user image captured by the image acquisition device provided on the movable platform; if the key point information is occluded, acquiring a user image captured by an image acquisition device provided on a wearable device, such as a head-mounted display device, a smart watch, etc., and then determining the key point information of the gesture action based upon the user image captured by the image acquisition device provided on the wearable device and the user image captured by the image acquisition device provided on the movable platform.

In some embodiments, the movable platform obtains a recognition result of the gesture based upon the key point information of the gesture action, and executes a corresponding operation according to the recognition result, such as detecting a photographing target in the image captured by the image acquisition device provided on the movable platform and photographing the photographing target, etc.

The movable platform or the wearable device can determine the key point information of the gesture action based upon the user image captured by the wearable device and the user image captured by the movable platform. In this way, user images of the target user under different viewing angles can be obtained, and hand images of the target user are determined under different viewing angles. Therefore, richer key point information of gesture actions may be obtained, and it prevents a gesture recognition accuracy rate from decreasing caused by the occlusion of a part of key points of the hand(s). For example, it can determine the key point information on the palm and back of a target user's hand.

In some embodiments, as shown in FIG. 6, the target user holds a handheld control device and wears a head-mounted display device; a movable platform may execute corresponding actions or functions according to instructions sent by the handheld control device and/or head-mounted display device. The user can slightly move a hand away from the handheld control device and make a corresponding gesture action, and then input the corresponding instruction of the gesture action to the head-mounted display device. The head-mounted display device generates a control instruction based upon the input instruction and executes a task operation according to the control instruction. Therefore, the user does not need to raise his hand to a touchpad of the head-mounted display device worn on his head for control, which saves more effort. Moreover, based on an interactive operation interface displayed by the head-mounted display device, the user can directly select and trigger the menu on the two-dimensional by hand(s). For example, a cursor in the interface can be controlled to move left, right, up or down, and the cursor can also be controlled to move slantly or diagonally, such as to move upper left or lower right, resulting in a faster operation and more friendly experiences.

Some embodiments of the present disclosure provide a control method for a head-mounted display device. The control method includes acquiring key point information of a gesture action of a target user, recognizing an input instruction based upon the key point information, and generating a control instruction based upon the input instruction and executing a task operation according to the control instruction. Therefore, the user can quickly use the hand(s) to make gesture actions to control the head-mounted display device. The input instructions corresponding to the gestures are recognized through the key point information, which can eliminate information that interferes with the gesture recognition, and the recognition speed is faster and more accurate. Thus, it is convenient for the user to control the head-mounted display device more quickly and accurately.

As can be appreciated, the key point information of the gesture action can be determined through a user image captured by the head-mounted display device and a user image captured by a movable platform and/or a handheld control device to obtain richer key point information of the gesture action, thereby preventing a decrease in a gesture recognition accuracy rate caused by the occlusion of a part of key points of the hand(s).

It will be appreciated that a user may "press" a virtual button in an interactive operation interface through a specific gesture to trigger a corresponding button function. For example, a position of a cursor in the interactive operation interface may be determined according to an obtained position of the fingertip of an index finger of the user based upon key points of the hand(s), and then a menu is further controlled by the movement of the fingertip of the index finger; and the key point information of the hand(s) is input into a gesture action classification model to identify a gesture of the user. When the user makes a specific gesture such as a "scissors hand", a virtual button at the cursor position is "pressed" to control the head-mounted display device, or a movable platform and/or a handheld control device connected through a head-mounted display device controller.

Figure 9:
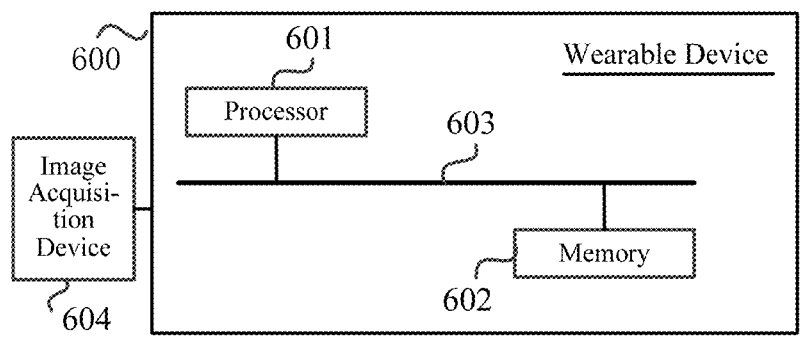
FIG. 9 illustrates a schematic block diagram of a wearable device according to some embodiments of the present disclosure.

Please refer to FIG. 9 in conjunction with the foregoing embodiments, FIG. 9 illustrates a schematic block diagram of a wearable device 600 according to some embodiments of the present disclosure. The wearable device 600 may be a virtual reality (VR) display device or a first person view (FPV) display device, etc. The wearable device 600 may be, for example, a glasses-type display device, a helmet-type display device or the like.

The wearable device 600 may include a processor 601 and a memory 602, and the processor 601 and the memory 602 are connected by a bus 603. The bus 603 is, for example, an I2C (Inter-integrated Circuit) bus.

In certain embodiments, the processor 601 may be a micro-controller unit (MCU), a central processing unit (CPU), a digital signal processor (DSP), or the like.

In certain embodiments, the memory 602 may be a flash chip, a read-only memory (ROM), a disk, an optical disk, a U disk, a mobile hard disk, or the like.

In certain embodiments, the wearable device 600 has its own image acquisition device 604 or is connected to an image acquisition device 604 through a communication interface. For example, the image acquisition device 604 may be located on a lower side, an upper side, a left side, or a right side of the wearable device 600, which is not limited in the present disclosure.

The processor 601 is configured to run a computer program stored in the memory 602 and to implement the aforementioned control methods when the computer program is executed.

The specific principles and implementation manners of the wearable device provided in embodiments of the present disclosure are similar to the control methods of the foregoing embodiments, therefore will not be repeated herein for conciseness.

Please refer to FIG. 5 in conjunction with the foregoing embodiment. FIG. 5 is a schematic diagram of a movable platform control system according to some embodiments of the present disclosure. As shown in FIG. 5, the movable platform control system includes a movable platform and a wearable device. The movable platform may include an image acquisition device and is configured to send an image captured by the image acquisition device to the wearable device; the wearable device is configured to display the image sent by the movable platform.

In certain embodiments, as shown in FIG. 8, the movable platform control system may further include a handheld control device for sending a remote control instruction to the movable platform. The movable platform is further configured to move according to the remote control instruction.

The specific principles and implementation manners of the movable platform control system provided in the embodiments of the present disclosure are similar to the control methods of the foregoing embodiments, and will not be repeated herein for conciseness.

Figure 10:
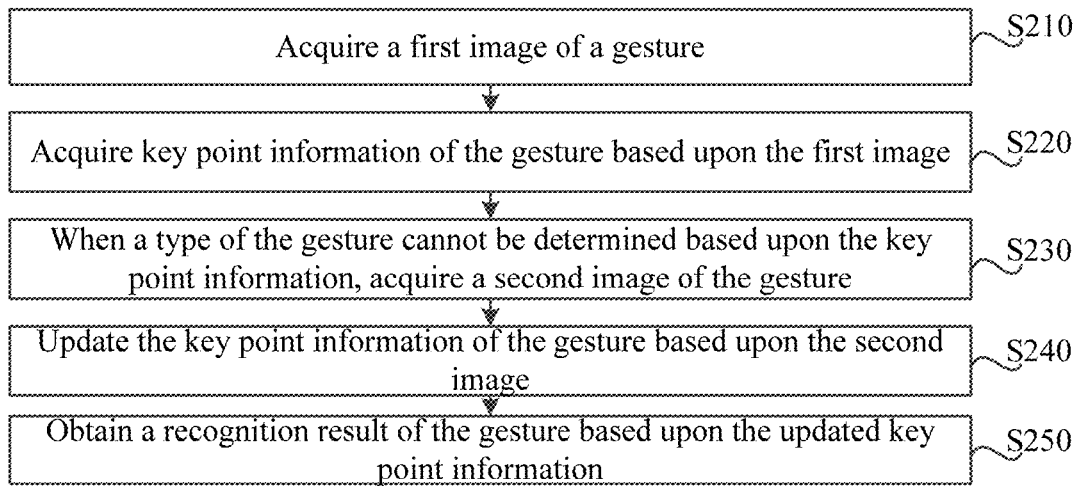
FIG. 10 illustrates a schematic flowchart of a gesture recognition method according to some embodiments of the present disclosure.

Please refer to FIG. 10 in conjunction with the foregoing embodiments. FIG. 10 illustrates a schematic flowchart of a gesture recognition method according to some embodiments of the present disclosure. The gesture recognition method may be applied to a wearable device, a movable platform, and the like, which is equipped with an image acquisition device.

The wearable device may be, for example, a head-mounted display device, a smart watch, a jacket, a waist belt, a protective belt, etc.; the head-mounted display device may be a virtual reality (VR) display device, first person view (FPV) display equipment or the like. The head-mounted display device may be, for example, a glasses-type display device, a helmet-type display device or the like.

The movable platform may be, for example, an unmanned aerial vehicle, a handheld gimbal, a mobile robot, a vehicle, or the like, which is equipped with an image acquisition device.

As shown in FIG. 10, the gesture recognition method may include step S210 to step S250.

Step S210 may including acquiring a first image of a gesture.

In certain embodiments, the first image is acquired by an image acquisition device provided on a wearable device.

In certain embodiments, a user imager captured by an image acquisition device provided on a wearable device is acquired.

In certain embodiments, the wearable device is a helmet, a visor, a watch, glasses, a jacket, a waist belt, or a protective belt, equipped with an image acquisition device.

Step S220 may include acquiring key point information of the gesture based upon the first image.

In certain embodiments, a hand detection is performed in the entire image, and the specific position of hand(s) is output. Based upon the specific position of the hand(s), a picture of a hand area is cropped from the image captured by the image acquisition device, for example, a camera. Then, the picture of the hand area is input into a hand key point detection neural network to obtain the key point information of the gesture, such as the number, positions, and other information of the hand key points in the picture.

Step S230 may include acquiring a second image of the gesture when a type of the gesture cannot be determined based upon the key point information.

In certain embodiments, if the number of key points in the key point information of the gesture is less than a preset threshold, such as 22, which is not limited in the present disclosure, it is determined that the key point information of the gesture action is occluded, and that the type of the gesture cannot be determined based upon the key point information.

If the number of key points is not less than the preset threshold, it is determined that the key point information of the gesture action is not occluded, and a recognition result of the gesture can be obtained based upon the key point information.

In certain embodiments, the second image is acquired by another image acquisition device provided on the wearable device.

In some embodiments, a head-mounted display device is equipped with at least two cameras at different positions. The head-mounted display device determines the key point information of the gesture action based upon user images captured by the at least two cameras provided at different positions. Thus, user images of the target user can be acquired at different viewing angles, hand images of the target user are determined at different viewing angles. It can get richer information on the key points of gesture actions.

Step S240 may include updating the key point information of the gesture based upon the second image.

In certain embodiments, the key point information on the palm and back of the hand(s) may be respectively acquired according to images of multiple cameras, so as to prevent a gesture recognition accuracy rate from being reduced due to the occlusion of a part of key points of the hand(s).

In certain embodiments, position information of the key points in the first image and position information of the key points in the second image are stored together as the key point information of the gesture.

Step S250 may include obtaining a recognition result of the gesture based upon the updated key point information.

A type of the gesture action can be determined based upon the key point information of the gesture action. For example, the key point information is sent to a gesture action classification model; the key point information is classified based upon the gesture action classification model to obtain the recognition result of the gesture.

In some embodiments, the first image may be acquired by an image acquisition device provided on a movable platform. Exemplary movable platform may be an unmanned aerial vehicle, a handheld gimbal, a mobile robot, or a vehicle, equipped with an image acquisition device.

In one embodiment, a user image captured by an image acquisition device provided on the movable platform is acquired; whether the key point information of the gesture action of the target user is occluded is determined based upon the user image captured by the image acquisition device provided on the movable platform. If it is determined that the key point information of the gesture action is not occluded, the key point information of the gesture action is determined based upon the user image captured by the image acquisition device provided on the movable platform. If the key point information is occluded, a user image captured by an image acquisition device provided on a wearable device, such as a head-mounted display device, a smart watch, etc., is acquired. Then, the key point information of the gesture action is determined based upon the user image captured by the image acquisition device provided on the wearable device and the user image captured by the image acquisition device provided on the movable platform.

In one embodiment, the second image is acquired by an image acquisition device provided on a wearable device.

The gesture recognition method provided in the present disclosure acquires a second image of the gesture when a type of a gesture cannot be determined based upon the key point information of a first image, and updates the key point information of the gesture based upon the second image, so as to obtain a recognition result of the gesture based upon the updated key point information. Therefore, richer key point information of gesture actions may be obtained, and a decrease in a gesture recognition accuracy rate caused by the occlusion of a part of key points of the hand(s) may be prevented.

Figure 11:
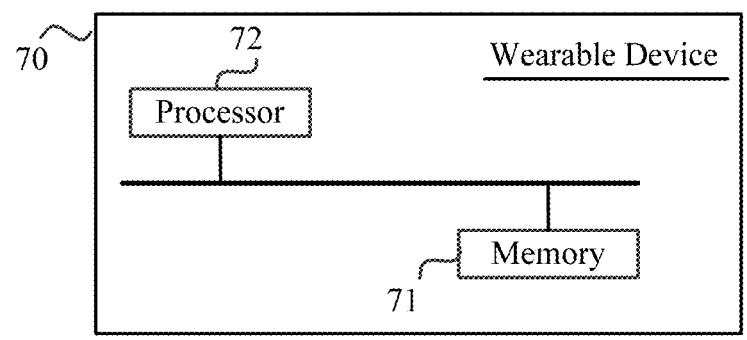
FIG. 11 illustrates a schematic block diagram of a wearable device according to some embodiments of the present disclosure.

Please refer to FIG. 11 in conjunction with the foregoing embodiments. FIG. 11 illustrates a schematic block diagram of a wearable device 70 according to some embodiments of the present disclosure. As shown in FIG. 11, the wearable device 70 may include a memory 71 and a processor 72. The memory 71 has stored a computer program thereon, the processor 72 is configured to execute the computer program and, when executing the computer program, to implement the gesture recognition method described above.

Exemplary wearable devices may include at least one of a head-mounted display device, a smart watch, a jacket, a waist belt, or a protective belt.

The specific principles and implementation manners of the wearable device provided in the present disclosure are similar to the control methods of the foregoing embodiments, and will not be repeated herein for conciseness.

The present disclosure also provides a computer-readable storage medium, the computer-readable storage medium stores a computer program, which includes program instructions. When the program instructions are executed by a processor, the steps of the control method and/or the gesture recognition method provided in the present disclosure are implemented.

The computer-readable storage medium may be an internal storage unit of the wearable device described in any of the foregoing embodiments, such as a hard disk or a memory of the wearable device. The computer-readable storage medium may also be an external storage device of the wearable device, such as a plug-in hard disk, a smart media card (SMC), and a secure digital (SD) card, a flash card, etc., equipped on the wearable device.

The computer readable storage medium may be a tangible device that can store programs and instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C #or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

The computer readable program instructions that may implement the device/systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The processor may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

The memory and non-volatile storage medium may be computer-readable storage media. The memory may include any suitable volatile storage devices such as dynamic random access memory (DRAM) and static random access memory (SRAM). The non-volatile storage medium may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

The program may be a collection of machine readable instructions and/or data that is stored in non-volatile storage medium and is used to create, manage and control certain software functions that are discussed in detail elsewhere in the present disclosure and illustrated in the drawings. In some embodiments, the memory may be considerably faster than the non-volatile storage medium. In such embodiments, the program may be transferred from the non-volatile storage medium to the memory prior to execution by a processor.

The wearable device, the gesture recognition method, the movable platform control system, and the computer-readable storage medium provided by the above-mentioned embodiments of the present disclosure acquire the key point information of the gesture action of the target user, recognize the input instruction based upon the key point information, and generate control instructions based upon input instructions to execute task operations according to the control instructions. The user can quickly use the hand(s) to make gesture actions to control wearable devices. The input instructions corresponding to gesture actions are recognized through key point information, which can eliminate information that interferes with gesture recognition. Therefore, the recognition speed is faster and more accurate, which makes it easier for the user to control the wearable device more quickly and accurately.

It will be appreciated that the key point information of the gesture action can be determined by a user image captured by a wearable device and a user image captured by a movable platform and/or a handheld control device, so as to obtain richer key point information of the gesture action, which prevents a decrease in a gesture recognition accuracy rate caused by the occlusion of a part of key points of the hand(s).

It will be appreciated that a user can "press" a virtual button in an interactive operation interface through a specific gesture to trigger a corresponding button function. A position of a cursor in the interactive operation interface may be determined based upon an obtained position of the fingertip of an index finger of the user according to key points of the hand(s); a menu may be controlled according to the movement of the fingertip of the index finger; and the key point information of the hand(s) may be input into a gesture action classification model to identify a gesture of the user. When the user makes a specific gesture such as a "scissors hand", a virtual button at the cursor position is "pressed" to control the wearable device or a movable platform and/or a handheld control device connected through a wearable device controller.

Each part of the present disclosure may be implemented by hardware, software, firmware, or a combination thereof. In the above exemplary embodiments, multiple steps or methods may be implemented by hardware or software stored in a memory and executed by a suitable instruction execution system.

The terms used herein are only for the purpose of describing specific embodiments and are not intended to limit of the disclosure. As used in this disclosure and the appended claims, the singular forms "a," "an," and "the" are intended to include the plural forms as well, unless the context clearly indicates otherwise. It should also be understood that the term "and/or" as used herein refers to and encompasses any or all possible combinations of one or more associated listed items. Terms such as "connected" or "linked" are not limited to physical or mechanical connections, and may include electrical connections, whether direct or indirect. Phrases such as "a plurality of," "multiple," or "several" mean two and more.

It should be noted that in the instant disclosure, relational terms such as "first" and "second," etc. are used herein merely to distinguish one entity or operation from another entity or operation without necessarily requiring or implying any such actual relationship or order between such entities or operations. The terms "comprise/comprising", "include/including", "has/have/having" or any other variants thereof are intended to cover non-exclusive inclusion, so that a process, method, article, or device that includes a series of elements includes not only those elements, but also other elements that are not explicitly listed, or also includes elements inherent to such processes, methods, articles, or equipment. If there are no more restrictions, the element defined by the phrase, such as "comprising a . . . ", "including a . . . " does not exclude the presence of additional identical elements in the process, method, article, or equipment that includes the element.

Finally, it should be noted that the above embodiments/examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

What is claimed is:

1. A control method of a head-mounted display device, comprising:
   acquiring key point information of a gesture of a target user;
   recognizing an input instruction based upon the key point information; and
   generating a control instruction based upon the input instructions and executing a task operation according to the control instruction,
   wherein the acquiring the key point information of the gesture action of the target user comprises:

acquiring a user image captured by an image acquisition device provided on the head-mounted display device, and wherein the generating the control instruction based upon the input instructions comprises:

determining a position of a preset part of a virtual hand of the target user in an interactive operation interface currently displayed on the head-mounted display device based upon the user image;

determining a function button based upon the determined position of the preset part of the virtual hand of the target user in the interactive operation interface;

determining operation control information based upon the function button and the input instruction; and generating the corresponding control instruction based upon the operation control information.

2. The control method of claim 1, wherein the acquiring the key point information of the gesture action of the target user further comprises:

determining the key point information of the gesture action based upon the user image captured by the image acquisition device provided on the head-mounted display device.

3. The control method of claim 2, wherein the determining the key point information of the gesture action based upon the user image captured by the image acquisition device provided on the head-mounted display device comprises:

determining the key point information of the gesture action based upon user images captured by at least two image acquisition devices provided on the head-mounted display device.

4. The control method of claim 2, wherein the determining the key point information of the gesture action based upon the user image captured by the image acquisition device provided on the head-mounted display device comprises:

determining the key point information of the gesture action based upon a user image captured by an image acquisition device provided on a handheld control device and the user image captured by the image acquisition device provided on the head-mounted display device.

5. The control method of claim 2, wherein the determining the key point information of the gesture action based upon the user image captured by the image acquisition device provided on the head-mounted display device comprises:

determining the key point information of the gesture action based upon a user image captured by an image acquisition device provided on a movable platform and the user image captured by the image acquisition device provided on the head-mounted display device.

6. The control method of claim 2, further comprising:

determining whether the key point information of the gesture action of the target user is occluded based upon the user image captured by the image acquisition device provided on the head-mounted display device;

under a condition that the key point information is occluded, acquiring a user image captured by an image acquisition device provided on a handheld control device and/or acquiring a user image captured by an image acquiring device provided on a movable platform; and determining the key point information of the gesture action based upon the user image captured by the image capture device provided on the head-mounted display device, and at least one of the user image captured by the image capture device provided on the handheld control device or the user image captured by the image capture device provided on the movable platform.

7. The control method of claim 2, wherein the acquiring the key point information of the gesture action of the target user comprises:

identifying a hand area in the user image; and acquiring the key point information in the hand area.

8. The control method of claim 1, wherein the recognizing the input instruction based upon the key point information comprises:

sending the key point information to a gesture action classification model; and obtaining the input instruction by classifying the key point information based upon the gesture action classification model.

9. The control method of claim 1, wherein the input instruction includes at least one of a confirmation instruction, a return instruction, or a mode switching instruction.

10. The control method of claim 9, further comprising:

under a condition that the input instruction recognized based upon the key point information is the mode switching instruction, turning on or turning off a body interaction mode according to the mode switching instruction, wherein the body interaction mode is configured to execute the task operation according to the control instruction generated by the recognized input instruction.

11. The control method of claim 1, wherein the executing the task operation according to the control instruction comprises:

according to the control instruction, switching the interactive operation interface displayed by the head-mounted display device, or adjusting a menu in the interactive operation interface currently displayed by the head-mounted display device.

12. The control method of claim 1, wherein the executing the task operation according to the control instruction comprises:

according to the control instruction, starting to store or ending to store data acquired by the head-mounted display device from a movable platform.

13. The control method of claim 1, wherein the executing the task operation according to the control instruction comprises:

sending a platform control instruction to a movable platform according to the control instruction to control the movable platform.

14. The control method of claim 5, wherein the movable platform comprises an unmanned aerial vehicle, an unmanned vehicle, or an unmanned boat.

15. A head-mounted display device, comprising a memory and a processor, the memory having a computer program stored thereon, and the processor configured to execute the computer program and, when executing the computer program, to implement:

acquiring key point information of a gesture of a target user;

recognizing an input instruction based upon the key point information; and generating a control instruction based upon the input instruction and executing a task operation according to the control instruction, wherein the acquiring the key point information of the gesture action of the target user comprises:

acquiring a user image captured by an image acquisition device provided on the head-mounted display device; and wherein the generating the control instruction based upon the input instructions comprises:

determining a position of a preset part of a virtual hand of the target user in an interactive operation interface currently displayed on the head-mounted display device based upon the user image;

determining a function button based upon the determined position of the preset part of the virtual hand of the target user in the interactive operation interface;

determining operation control information based upon the function button and the input instruction; and generating the corresponding control instruction based upon the operation control information.

16. A gesture recognition method, comprising:

acquiring a first image of a gesture;

acquiring key point information of the gesture based upon the first image;

under a condition that a type of the gesture is failed to be determined based upon the key point information, acquiring a second image of the gesture;

updating the key point information of the gesture based upon the second image; and obtaining a recognition result of the gesture based upon the updated key point information, wherein the first image is acquired by an image capturer provided on a movable platform and the second image is acquired by an image capturer provided on a head-mounted display device.

* * * * *